US011400676B2

(12) United States Patent
Sperlich

(10) Patent No.: US 11,400,676 B2
(45) Date of Patent: *Aug. 2, 2022

(54) WOOD MATERIAL PANEL PRESSING DEVICE AND METHOD FOR MONITORING A WOOD MATERIAL PANEL PRESSING DEVICE

(71) Applicant: SWISS KRONO TEC AG, Lucerne (CH)

(72) Inventor: Daniel Sperlich, Halenbeck-Rohlsdorf (DE)

(73) Assignee: SWISS KRONO TEC AG, Lucerne (CH)

( * ) Notice: Subject to any disclaimer, the term of this patent is extended or adjusted under 35 U.S.C. 154(b) by 400 days.

This patent is subject to a terminal disclaimer.

(21) Appl. No.: 16/696,082

(22) Filed: Nov. 26, 2019

(65) Prior Publication Data

US 2020/0094507 A1    Mar. 26, 2020

Related U.S. Application Data

(63) Continuation-in-part of application No. 16/332,541, filed as application No. PCT/EP2017/074374 on Sep. 26, 2017, now Pat. No. 10,525,651.

(30) Foreign Application Priority Data

Oct. 6, 2016 (EP) .................................... 16192631

(51) Int. Cl.
*B30B 5/06* (2006.01)
*G01N 21/89* (2006.01)
*G01N 21/84* (2006.01)

(52) U.S. Cl.
CPC ........... *B30B 5/06* (2013.01); *G01N 21/8901* (2013.01); *G01N 2021/8444* (2013.01); *G01N 2021/8472* (2013.01)

(58) Field of Classification Search
CPC ......... B30B 15/148; B30B 5/06; B27N 1/029; B27N 3/24
See application file for complete search history.

(56) References Cited

U.S. PATENT DOCUMENTS 3,795,470 A    3/1974  De Mets
5,433,905 A *  7/1995  Tisch ........................ B30B 5/06
                                                      425/371

(Continued)

FOREIGN PATENT DOCUMENTS

CN        1974150        6/2007
CN      101229651        7/2008

(Continued)

OTHER PUBLICATIONS

International Search Report in related International Application No. PCT/EP2017/074374 dated Nov. 23, 2017, 7 pages.

(Continued)

*Primary Examiner* — Matthew Katcoff
(74) *Attorney, Agent, or Firm* — Andrew M. Calderon; Roberts Calderon Safran & Cole, P.C.

(57) ABSTRACT

The disclosure relates to a wood material panel pressing device for pressing a fibrous press cake in order to produce a wood material panel including an inspection device that is designed to emit a signal in the event of a disruption. According to the disclosure, the wood material panel pressing device for pressing a fibrous press cake for producing an HDF panel or an MDF panel includes: an inspection device, which is designed to emit a signal in an event of a disruption, wherein: the inspection device has a camera and an evaluation unit, the camera is arranged in an intake region of the wood material panel pressing device; and the evaluation unit automatically emits a signal in an event of a blow-out of press cake particles.

26 Claims, 6 Drawing Sheets

(56) References Cited

U.S. PATENT DOCUMENTS

| | | | |
|---|---|---|---|
| 6,098,532 A | 8/2000 | Sebastian et al. | |
| 8,153,040 B2 * | 4/2012 | Schuermann | B27N 3/14 |
| | | | 425/371 |
| 9,409,326 B2 * | 8/2016 | Schromm | B29C 43/228 |
| 2008/0055591 A1 | 3/2008 | Walton | |

FOREIGN PATENT DOCUMENTS

| | | |
|---|---|---|
| DE | 102005049880 | 4/2007 |
| DE | 102007019390 | 10/2008 |
| DE | 102013112260 | 5/2015 |
| JP | S4849273 U | 6/1973 |
| JP | S5585824 | 6/1980 |
| JP | H07314415 A | 12/1995 |
| WO | 2009071738 | 6/2009 |

OTHER PUBLICATIONS

Written Opinion in related International Application No. PCT/EP2017/074374 dated Nov. 23, 2017, 7 pages.

* cited by examiner

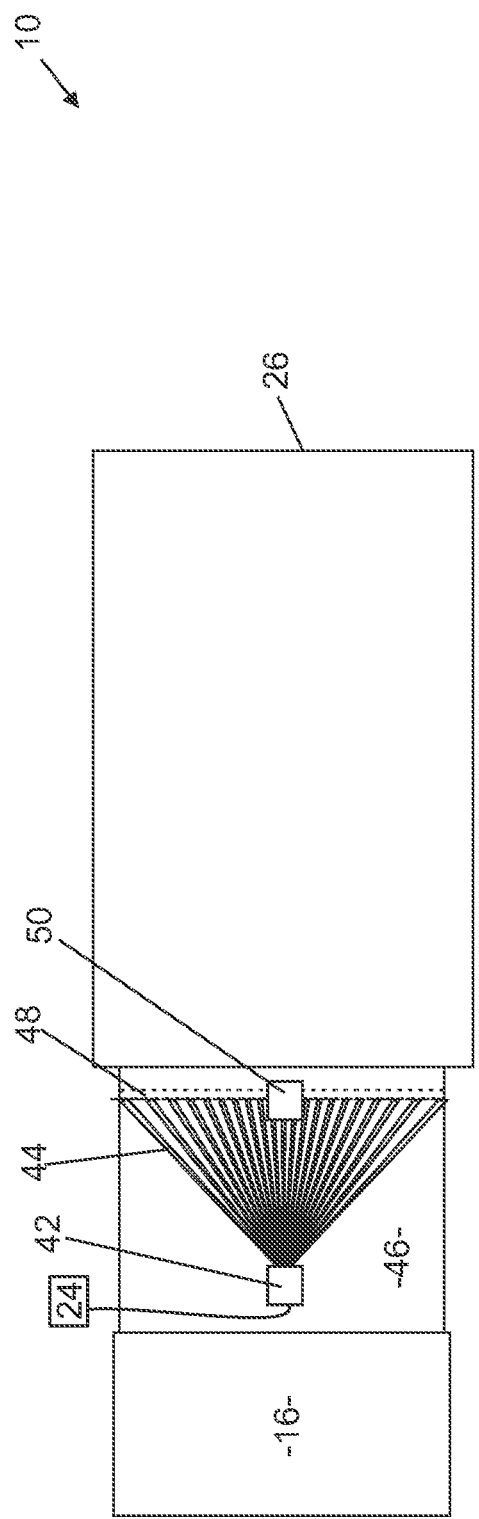
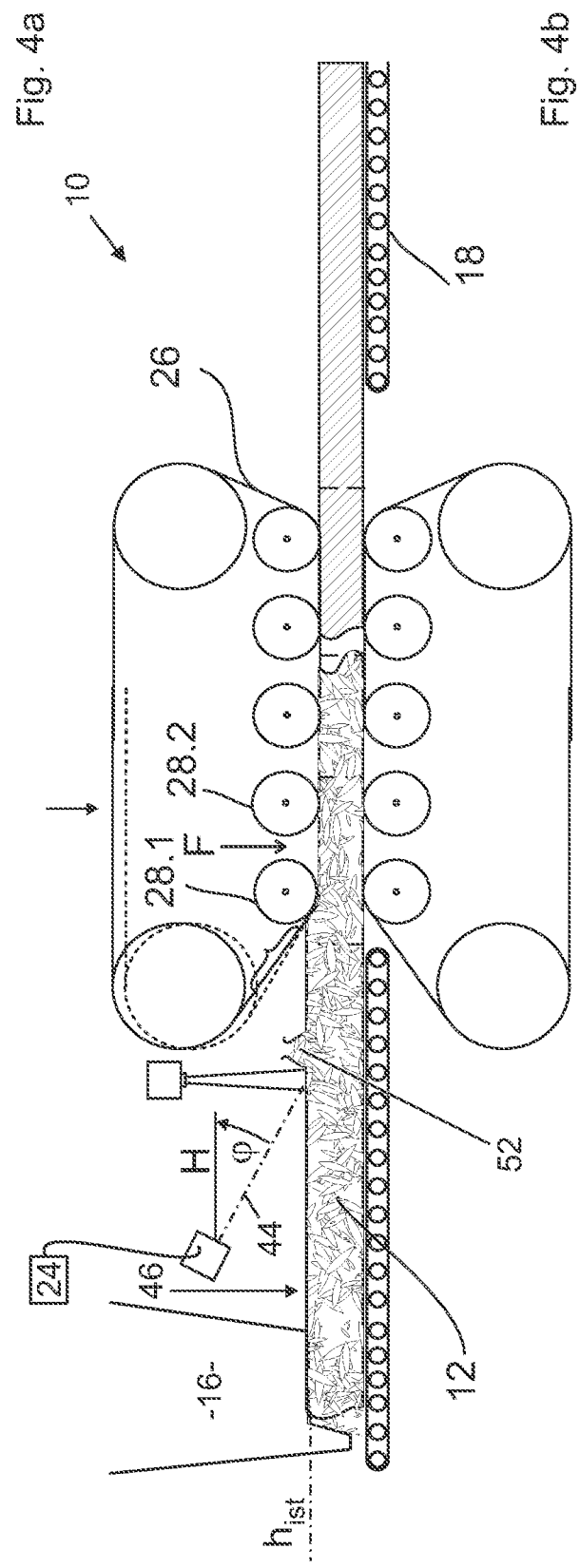
Fig. 4a
Fig. 4b

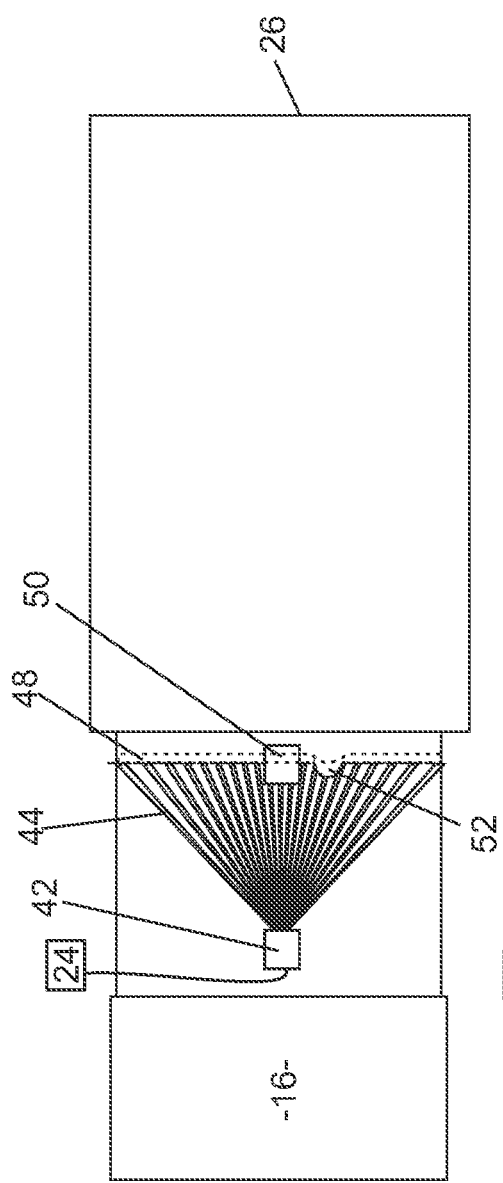
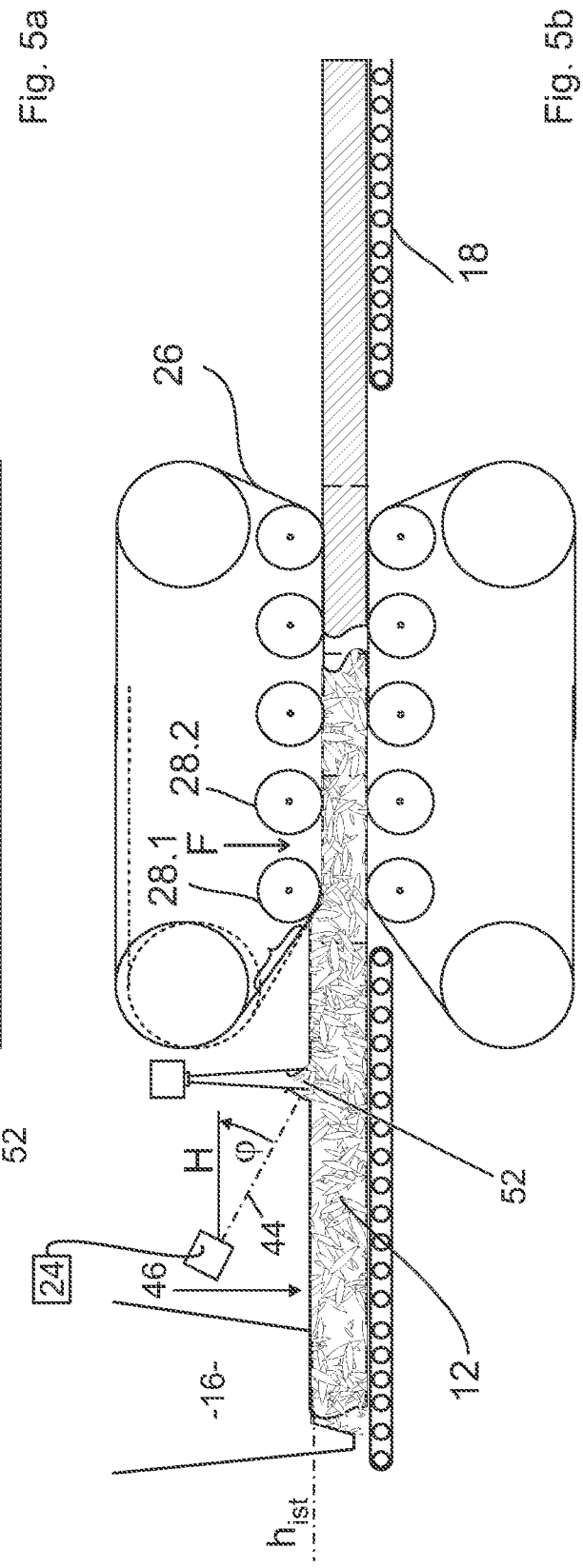

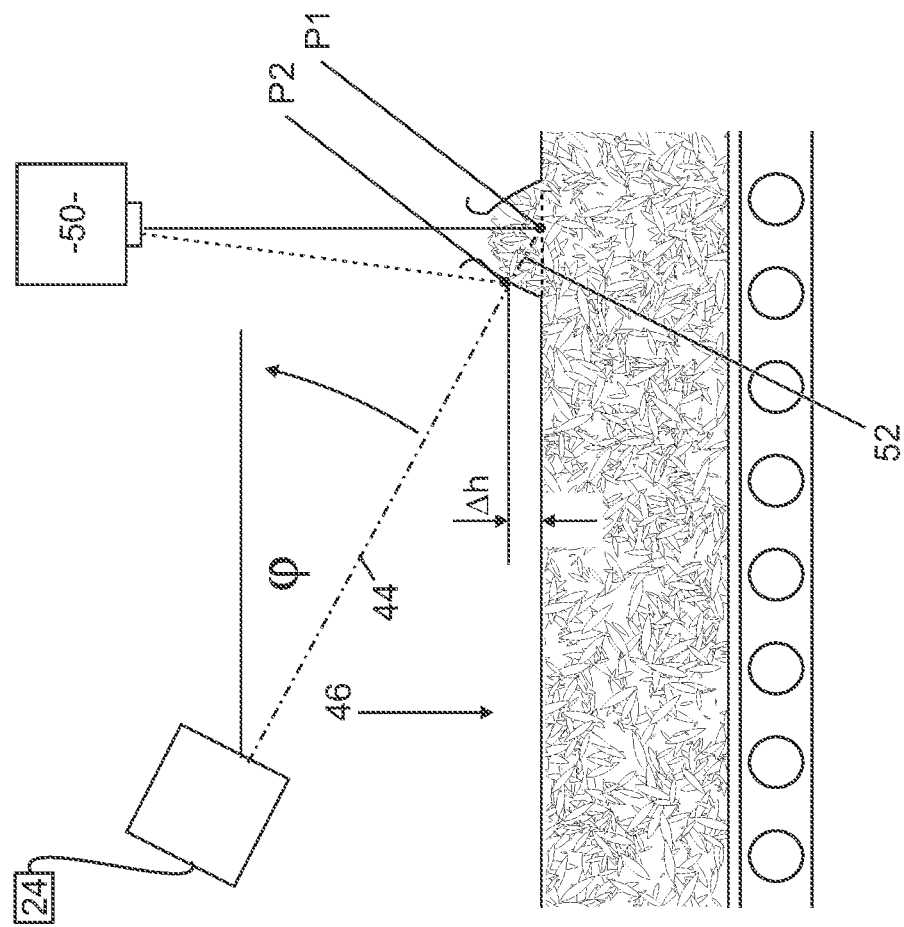

WOOD MATERIAL PANEL PRESSING DEVICE AND METHOD FOR MONITORING A WOOD MATERIAL PANEL PRESSING DEVICE

FIELD OF THE INVENTION

The invention relates to a wood material panel pressing device for pressing a fibrous press cake for producing an HDF panel of an panel, comprising an inspection device that is designed to emit a signal in the event of a disruption and/or monitor the fibrous press cake in an intake region. According to a second aspect, the invention relates to a method for monitoring a wood material panel pressing device for pressing a fibrous press cake in order to produce a wood material panel.

DISCUSSION OF BACKGROUND INFORMATION

A high-density fiberboard (HDF) is a type of fiberboard, which is an engineered wood product. It is similar to particle board and medium-density fiberboard, but is denser and usually much stronger and harder because it is made out of exploded wood fibers that have been highly compressed. Consequently, the density of hardboard is usually 31 pounds per cubic foot (500 kg/m$^3$) or more and is usually about 50-65 pounds per cubic foot (800-1,040 kg/m$^3$). It differs from particle board in that the bonding of the wood fibers generally requires no additional materials, although resin may be added. Unlike particle board, it tends not to split or to crack.

Medium-density fibreboard (MDF) is an engineered wood product made by breaking down hardwood or softwood residuals into wood fibres, often in a defibrator, combining it with a binder, such as a wax and a resin binder, and forming panels by applying high temperature and pressure. MDF is generally denser than plywood. It is made up of separated fibres, but can be used as a building material similar in application to plywood. It is usually stronger and much denser than particle board.

The term MDF may be understood as a generic name for any dry process fiber board. MDF is typically made up of 82% wood fiber, about 9% urea-formaldehyde resin glue, about 8% water and about 1% paraffin wax. The density is typically between 500 kg/m$^3$ (31 lb/ft$^3$) and 1,000 kg/m$^3$ (62 lb/ft$^3$). The range of density and classification as light, standard, or high density board is a misnomer and confusing. The density of the board, when evaluated in relation to the density of the fiber that goes into making the panel, usually is more important. A thick MDF panel at a density of 700-720 kg/m$^3$ may be considered as high density in the case of softwood fibre panels, whereas a panel of the same density made of hard wood fibres is not regarded as so. The evolution of the various types of MDF has been driven by differing need for specific applications.

Wood material panel pressing devices are used to compact fibrous press cakes or press them to produce wood material panels. In particular, the invention relates to continuously operating wood material panel pressing devices with which the fibrous press cake is continuously spread and pressed and/or compressed. This type of wood material panel pressing device is preferably operated at as high a speed as possible. However, high feed speeds, at which the fibrous press cake is moved through the wood material panel pressing device, lead to an increased likelihood of material defects. The fibrous press cake must therefore be compacted during pressing. However, this requires air being pressed out of the fibrous press cake. If this happens too quickly, the escaping air may tear fibers of the fibrous press cake, leading to crater-like ruptures. Such ruptures, which are also known as blow-outs, generally mean that the ruptured area of the wood material panel that has been produced cannot be used, thereby resulting in waste.

A further source of defects is a fluctuation of the fibrous press cake above a predetermined tolerance.

From DE 196 22 712 B4, DE 10 2007 019 390 A1 and DE 10 2005 049 880 A1 it is known to allow thin metal wires to slide over the fibrous press cake, said wires establishing electrical contact with a press plate of the one pressing device when the thickness of the fibrous press cake exceeds a predetermined maximum thickness. The disadvantage of this system is that it only allows for a binary monitoring, namely whether the maximum thickness has been exceeded. A further disadvantage is that ruptures, as described above, are only detected if they occur immediately beneath a wire.

WO 2009/071738 A1 describes a press system for gluing wooden rods together to produce edge-glued panels. To ensure a uniform adhesion, a thermographic image is captured by a thermal camera after gluing. If the temperature of the finished edge-glued panel deviates considerably, even just locally as the case may be, from a predetermined temperature, the heat output of the press system is corrected. To achieve an especially precise measurement result, the temperature of the arranged wooden rods can also be measured prior to gluing by means of a thermal camera. This renders it possible to determine where the local heat output of the press system is too low. This type of press system is unsuitable for the pressing of fibrous press cakes to produce wood material panels, as a fibrous press cake requires a high surface pressure and cannot withstand lateral pressure. Furthermore, only the (local) heat output can be controlled or regulated with such a system; it is thus unsuitable for preventing blow-outs.

SUMMARY OF THE INVENTION

The invention aims to reduce the amount of waste.

The advantage of the invention is that it allows monitoring to be conducted virtually in real-time. In other words, a time period between the occurrence of a defect and the recognition of the defect is very short, for instance it may be less than one second. This enables a rapid reaction, such that method parameters, for example, can be altered in such a way that defects are prevented in the future.

A further advantage is that this monitoring is not particularly complex: The required components, such as the camera and the evaluation unit in the form of evaluation electronics, are standard products that are easily procured.

It was deemed unrealistic that the process monitoring could be done at all by camera, as such wood material panel pressing devices can create a lot of dust. It was therefore anticipated that splinters would lead to false alarms and/or would cause the camera to become dirty too quickly. In addition, the inlet side of wood material panel pressing devices generally features spraying devices, by means of which a fluid, such as water containing surfactants, can be sprayed onto the fibrous press cake. A positioning of the camera in such a way that it can fulfil its purpose thus generally requires a modification of these devices.

The term camera may refer to an infrared camera or a camera which absorbs visible light.

The camera has an optical axis which forms a maximum angle of attack with the direction of material flow of preferably 70°, especially a maximum of 60°, preferably a maximum of 50°, but especially preferably a maximum of 40°. The angle of attack is preferably at least 0°, especially at least 5°, preferably at least 10°.

Within the scope of the present invention, a wood material panel pressing device should be understood to mean, for instance, a device by means of which the fibrous press cake can be continuously compressed to form a wood material panel. To this end, the wood material panel pressing device preferably comprises a circulating press plate that is heated and pressed onto the fibrous press cake. The wood material panel preferably refers to an HDF, MDF or OSB panel. Alternatively, the wood material panel pressing device is a pre-press that forms part of a system for producing wood material panels and features a press element in the form of a press cloth.

The inspection device should be understood particularly to mean a device that allows a system operator to detect the condition of the wood material panel pressing device. It is possible, but not necessary, that the inspection device is connected to a machine controller, such that the signal effects a change of at least one machine parameter without the need for human intervention, i.e. it occurs directly. A machine parameter should be understood to mean a parameter which determines the production conditions of the wood material panel pressing device, such as press force, temperature or intake angle. The intake angle is the angle at which a press element is oriented on the inlet side relative to the horizontal just before the press element comes into contact with the fibrous press cake and compacts it.

The continuous recording of the images of the intake region should be understood especially to mean that images are captured at regular intervals. It is possible and preferable for the images to be captured at temporally equidistant intervals; however, this is not necessary. In particular, an image is captured at least every three seconds, preferably at least once per second. It is especially favorable if an image is captured several times per second. Generally speaking, cameras have an image-capturing frequency of more than 10 images per second. It is possible, but not generally necessary, for more than 20 images to be captured per second.

The evaluation region should be understood to mean a region of the wood material panel pressing device, in particular the section of the press element which, at a given time, is at a predetermined distance from the target horizontal of the fibrous press cake. The target horizontal of the fibrous press cake is the imaginary line which, within the camera's field of vision, indicates the point of the top side of the fibrous press cake where the top side comes into contact with the press plate. Under ideal production conditions, the target horizon is a line, especially a horizontally running line, whose position does not change.

The measurement data is especially the data that the camera records for each pixel in every recording cycle. Generally speaking, the measurement data are voltages or electric currents that encode a color and brightness of the light falling on the corresponding pixel.

The emission of a signal should be understood especially to mean that a signal—either perceptible or not perceptible to humans—is emitted, such as a change in a voltage or a digitally encoded signal. Of course, it is possible that signals are continuously emitted, even if the evaluation data does not change by more than a predetermined tolerance value. It is only crucial that, if the deviation is greater than the tolerance value, a signal is emitted or a signal that is otherwise emitted, which indicates an undisturbed condition, does not occur.

It is possible, but not necessary, that this signal is forwarded to a machine controller, which automatically amends at least one production parameter. Rather, it is also possible for the signal to be optically and/or acoustically reproduced for a machine operator in such a way that he/she is able to take suitable measures.

It is possible, but not necessary, for additional pixels to be evaluated that are not evaluation region pixels. For instance, the inspection device may be configured such that it continuously captures a background brightness so that fluctuations in the brightness, which are caused for example by changing light conditions, do not trigger a false alarm.

The property that the evaluation data changes by more than the predetermined tolerance value should also be understood particularly to mean that data or variables derived from the evaluation data, such as temporal changes (i.e. the first time derivative) or the change of changes (i.e. the second time derivative) or other variables or progressions of variables calculated from the measurement data, are recorded or calculated and compared with the predetermined tolerance value.

The press element should be understood especially to mean a press plate or a press cloth. Specifically, a press plate is a circulating plate, by means of which the fibrous press cake is compressed to produce a wood material panel. A press cloth should be understood especially to mean a breathable element that forms part of a pre-press and serves to force air out of the fibrous press cake. The press cloth may be a textile. However, it is also possible that the press cloth refers to another breathable element, such as a wire mesh or a perforated plate.

According to a preferred embodiment, the measurement data is collected for a number of regions that border one another and together cover a full width of the fibrous press cake. In other words, the fibrous press cake is captured by the camera across one full width and the corresponding measurement values are evaluated.

The wood material panel pressing device preferably comprises a circulating press element, which may also be called a press plate if the wood material panel pressing device is a hot press, wherein the inspection device is designed to automatically conduct a method that includes the step which comprises a continuous recording of measurement data for reference region pixels, wherein the reference region pixels belong to at least one predetermined reference region and wherein precisely one reference region is allocated to each evaluation region, said reference region being located in front of the evaluation region in terms of a direction of movement of the press element.

The continuous recording of measurement data for evaluation region pixels then preferably includes a calculation of a deviation between the measurement data of the evaluation region pixels and the measurement data of the reference region pixels which has been shifted by a time delay, wherein the time delay is the time required for a section of the press element to move from the reference region to the evaluation region. This has the advantage that any inhomogeneities of the press element, particularly of the press plate, do not trigger false alarms. The reason behind this is that, in the event of damages, the press plate is often repaired by cutting out the damaged area. A suitable piece of plate is inserted into the resulting hole. The joints between the inserted plate and the area around it are particularly susceptible to discolorations, which in turn may also trigger false alarms. This can be prevented by way of the steps in the method given. The invention also includes a method according to the invention which includes these steps.

According to a preferred embodiment, the wood material panel pressing device is a hot press, which means a press at whose outlet side a dimensionally stable wood material panel emerges. A dimensionally stable wood material panel should be understood to mean a wood material panel that carries its own weight when placed on a lateral edge. A hot press should be understood especially to mean a press which introduces heat into the fibrous press cake by way of thermal conduction, and in particular without any microwaves.

Alternatively, the wood material panel pressing device is a pre-press at whose outlet side a fibrous press cake emerges which is not dimensionally stable.

The invention also includes a wood material panel press system that comprises at least one wood material panel pressing device. One of these wood material panel pressing devices preferably refers to a pre-press that comprises the above-named inspection device, wherein a second wood material panel pressing device is arranged behind this pre-press in the direction of material flow; said second pressing device is provided in the form of a hot press for compressing the fibrous press cake that emerges from the pre-press.

The wood material panel pressing device preferably has a lighting device for illuminating the intake region. This has the advantage that any extreme fluctuations in the light conditions in an area surrounding the intake region lead to proportionally smaller fluctuations in the measurement results.

The inspection unit is preferably configured to automatically conduct a method according to the invention. This should be understood particularly to mean that the inspection device executes the steps given without requiring the intervention of an operator.

The method preferably comprises the steps (i) grouping of evaluation region pixels into a first region and at least one second region and (ii) for all regions, the capturing of the pixels which feature one property—especially the color, brightness and/or contrast with at least one adjacent pixel—that changes more drastically than a threshold value, and (iii) calculation of a change parameter from the number of this pixel and the comparison of this change parameter with the tolerance value.

It is possible, but not necessary, for the change in the property to be calculated from immediately consecutive measurement results. However, it is also possible that an average is calculated across two, three or more consecutive measurement results, or a measurement value, which has been processed in a different manner, is calculated from these measurement results.

In an ideal process, the measurement data of the pixels do not change over time. During undisturbed operation, the measurement data fluctuates, for example due to statistical measurement errors or randomly changing environmental conditions. If a disruption does occur, for instance an emergence of a gas bubble, i.e. a blow-out, as described above, the property changes more drastically over time.

The threshold value is defined by the recording of the temporal fluctuation of the property during undisturbed operation. For instance, the threshold value is selected such that, during undisrupted operation, it is exceeded a maximum of one time per minute and pixel due to random fluctuation.

The tolerance value for the change parameter is determined by initially evaluating the change parameter during undisturbed operation over a predetermined time period of one hour, for instance. The feed speed and/or intake angle α is then increased until the above-described ruptures or blow-outs occur, which cause waste. The change parameter is evaluated at the same time. The tolerance value is selected by taking a value that lies below the change value at which waste is produced.

The evaluation region pixels are preferably grouped into at least 20 regions. It is beneficial if these regions border one another. This means that there are no pixels or so few pixels between two regions that blow-outs can be still be clearly recognized. It is especially beneficial if the regions directly border one another as this allows for the highest likelihood of defect recognition.

According to a preferred embodiment, the emission of the signal effects a change in the intake angle, wherein the intake angle is the angle between the horizontal plane and a line of best fit through the press element. Alternatively or additionally, the emission of the signal effects a reduction in the feed speed. To achieve this, the inspection device may be directly connected to a machine controller. For example, the feed speed is reduced by between 3% and 5% if the tolerance value is exceeded.

According to a preferred embodiment, the method comprises the steps of a calculation of an actual horizontal of the fibrous press cake and an emission of a signal if the actual horizontal deviates from the target horizontal by more than a level error threshold value. Should the actual horizontal surpass the target horizontal by more than one alarm value, the wood material panel pressing device is preferably automatically stopped so as to prevent any damages to the press.

BRIEF DESCRIPTION OF THE DRAWINGS

In the following, the invention will be explained in more detail by way of the attached drawings.

FIG. 4a depicts a top view on a wood material panel pressing device according to another embodiment of the invention.

FIG. 4b depicts a side view on the wood material panel pressing device according to FIG. 4a.

FIGS. 5a and depict 5b the wood material panel pressing device according to FIGS. 4a and 4b when a blow-out are is detected.

FIG. 6 depicts a detail of FIG. 5b.

DETAILED DESCRIPTION

Figure 1:
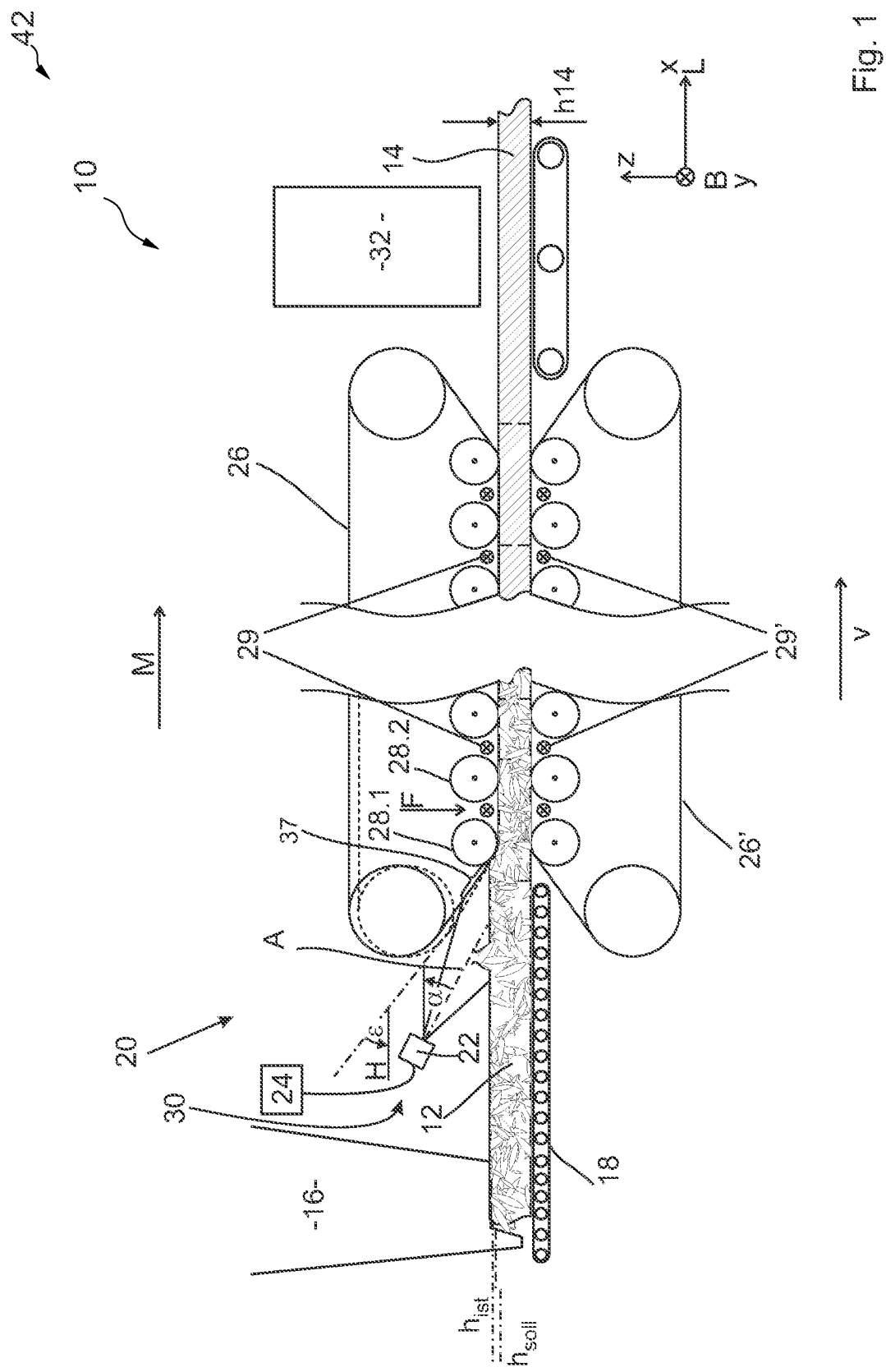
FIG. 1 is a schematic view of a wood material panel pressing device according to the invention.

FIG. 1 shows a wood material panel pressing device 10 according to the invention in the form of a hot press for pressing a fibrous press cake 12 to produce a wood material panel 14, i.e. an HDF or an MDF panel. The wood material panel pressing device has a spreading device 16 for spreading the fibrous press cake 12 on a conveyor 18.

The wood material panel pressing device 10 features an inspection device 20, which comprises a camera 22 and an evaluation unit 24 that is connected to said camera. An optical axis A is oriented at an axis angle α to the horizontal H, this angle generally lying between 0° and 45° and is α=10° in the present case. A positive axis angle means that the camera is aimed downwards.

The wood material panel pressing device 10 has a press element 26 in the form of a press plate, which forms a closed loop and is pressed onto fibrous press cake 12 by means of drums 28.1, 28.2, . . . with a press force F. Using a schematically depicted heater 29, the press element 26 is also brought to a predetermined temperature $T_{26}$ by means of a hot thermal oil. In the present case, the wood material panel pressing device 10 also comprises a second press element 26', which is pressed against the fibrous press cake 12 from below via the drums 28'.1, 28'.2, . . . . The second press element 26' is also heated by heating elements 29'.

After pressing, the MDF or HDF panel has a thickness h14 between 0.06 inch (1.5 millimeter) and 0.2 inch (5 millimeter). A gap between the press elements 26, 26' at the outtake region may be between 0.06 inch (1.5 millimeter) and 0.2 inch (5 millimeter) as well.

The press element 26 runs in the region in which it comes into contact with the fibrous press cake 10 for the first time, at an intake angle ε to the horizontal H. The intake angle ε is adjustable, as is indicated by the press plate depicted with a dashed line.

The camera 22 captures images of an intake region 30 in which the fibrous press cake 12 comes into contact with the press element 26 for the first time. In the interior, the fibrous press cake 12 has an actual horizontal at a height $h_{ist}$, which corresponds to a target height $h_{soll}$ in the situation shown in FIG. 1. A level error Δh lies below a level error threshold value $Δh_S$.

During operation, the fibrous press cake 12 moves in a direction of material flow M at a feed speed v. A trimming system 32 and/or other processing devices, such as a digital printing device for imprinting the wood material panel 14, may be arranged behind the wood material panel pressing device in the direction of material flow M.

Figure 2A:
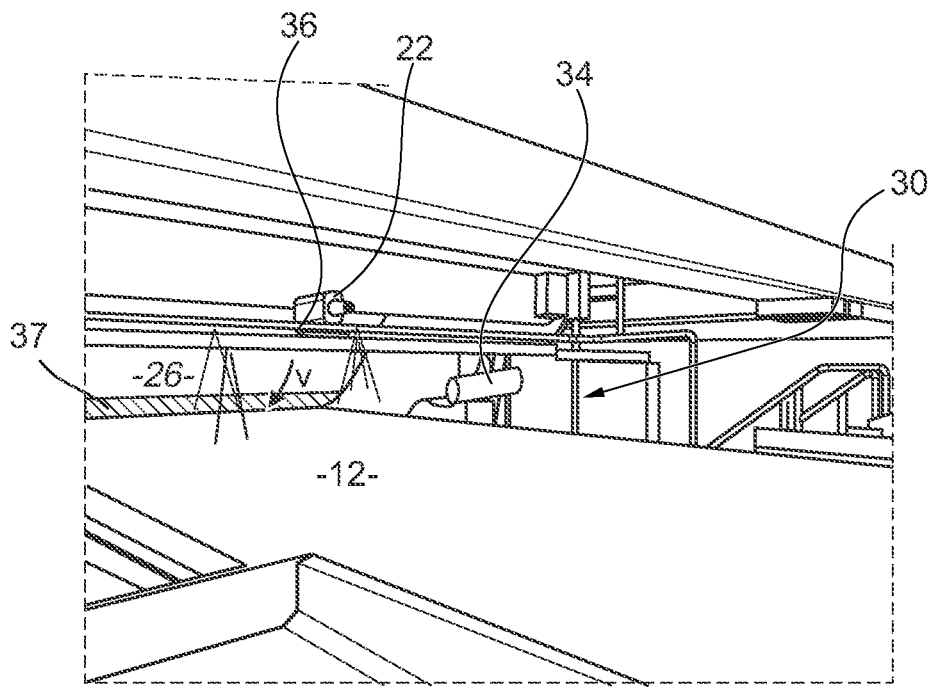
FIG. 2a is a perspective detailed view of the intake region of the wood material panel pressing device according to FIG. 1.

FIG. 2a shows a perspective view of the intake region 30 of the wood material panel pressing device. The fibrous press cake 12, the press element 26, a lighting device 34—in the form of an LED light in the present case—the camera 22 and a humidification system 36 can be seen. The humidification system 36 can be used to spray a liquid mist, especially one made of water that contains surfactants, onto the fibrous press cake 12.

Figure 2B:
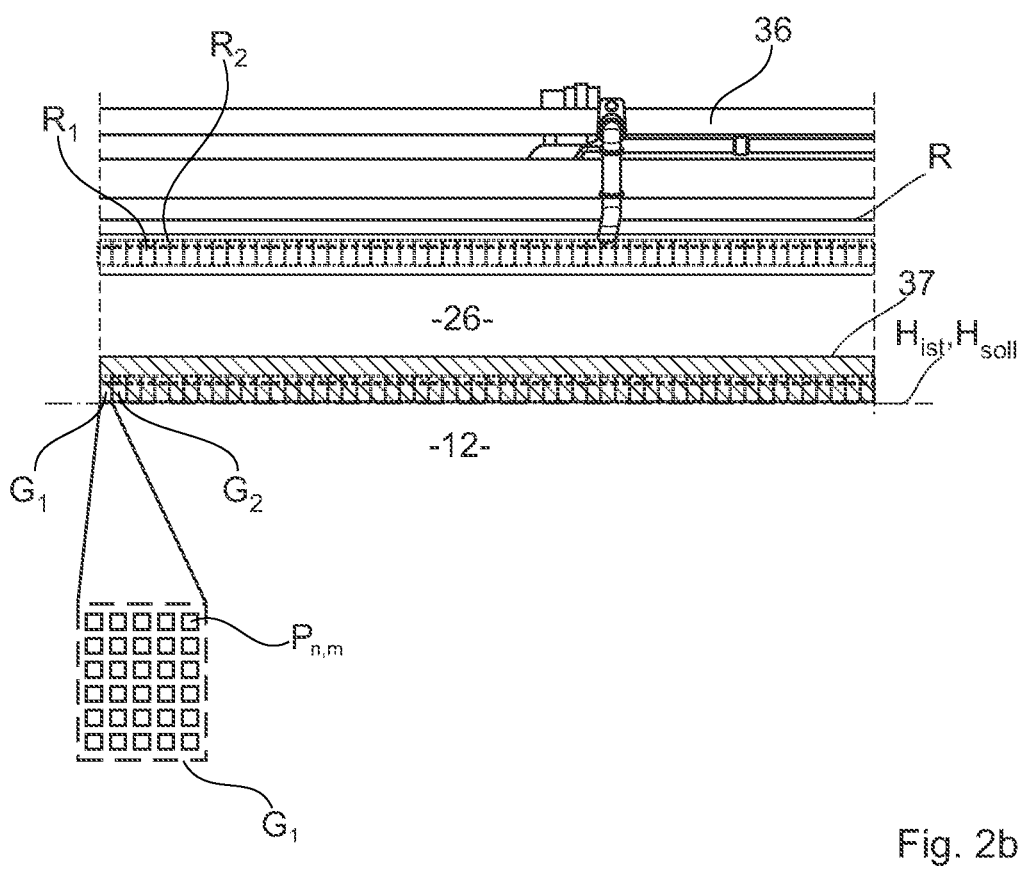
FIG. 2b is an image of the intake region in which the regions that are used for evaluation are depicted.

FIG. 2b shows an image B of the intake region 30 that has been captured using the camera 22. An actual horizontal $H_{ist}$, of the fibrous press cake 12, situated at the height $h_{ist}$, can be seen in the lower partial image. An evaluation region 37 is also depicted which borders a target horizontal $H_{soll}$ of the fibrous press cake 12 at the top, said horizontal lying at the height $h_{istsoll}$, wherein $h_{ist}=h_{soll}$ in the present case.

The evaluation region 37 is divided into N regions $G_i$ (i=1, 2, . . . , N), each of which has several pixels P. The regions $G_i$ may also be referred to as clusters.

Each region $G_i$ relates to an image of a region $B_i$ of the evaluation region 37. In other words, regions indicate sections of the wood material panel pressing device, such as the press element 26, whereas the regions $G_i$ are groups of pixels $P_{n,m}$, wherein n and m are the number indices of the pixels of the camera 22.

For each pixel $P_{n,m}$, a measured value $P_{n,m}(t_j)$ is recorded at regular intervals, in particular the brightness $b_{n,m}(t_j)$ and the color $f_{n,m}(t_j)$. The brightness contrast, for example $K_{n,m}(t_j)=b_{n,m}(t_j)-b_{n-1,m}(t_j)$, is also calculated as is the color contrast $k_{n,m}(t_j)=f_{n,m}(t_j)-f_{n-1,m}(t_j)$. Alternatively, the brightness contrast may be defined differently, for instance $K_{n,m}(t_j)=b_{n,m}(t_j)-b_{n+1,m}(t_j)$ or $K_{n,m}(t_j)=b_{n,m}(t_j)-b_{n,m-1}(t_j)$ or $K_{n,m}(t_j)=b_{n,m}(t_j)-b_{n,m+1}(t_j)$ or a mean of these values. The same applies for the color contrast $k_{n,m}(t_j)$. The measurement data of the evaluation pixels is referred to as evaluation data, as preferably only it is involved in the evaluation.

At each point in time $t_j$ and for each region i, the evaluation unit 24 determines a change parameter $D_i$ to indicate whether the evaluation data $b_{n,m}(t_j)$, $f_{n,m}(t_j)$, $K_{n,m}(t_j)$ and $k_{n,m}(t_j)$ is in each case greater than a predetermined threshold value. It is thus examined for all n and m, for which the pixel $P_{n,m}$ lies in the region i, whether $b_{n,m}(t_j)>b_{max}$, $f_{n,m}(t_j)>f_{max}$, $K_{n,m}(t_j)>K_{max}$ and $k_{n,m}(t_j)>k_{max}$ applies. For each region $G_i$, the pixels are counted for which at least one of the conditions is met—the corresponding number is the change parameter D. If the change parameter $D_i$ exceeds a tolerance value $D_T$ for at least one region $G_i$, a signal is emitted.

Alternatively, the temporal changes $b(t_j)-b(t_{j-1})$, $f(t_j)-f(t_{j-1})$, $K(t_j)-K(t_{j-1})$, $k(t_j)-k(t_{j-1})$ are used by the evaluation unit 24 to determine a change parameter $D_i$ at each point in time $t_j$ and for each region i, which is achieved as follows:

$$D_i(t_j)=\Sigma_{n,m\ mit\ P_{n,m}\in G_i}(\alpha b_{n,m}(tj)+\beta f_{n,m}(tj)+\gamma K_{n,m}(tj)+\delta k_{n,m}(tj)).$$

The parameters α, β, γ, δ are real numbers that are identified in preliminary tests. If the change parameter $D_i$ exceeds a tolerance value $D_T$, i.e. $D_i>D_T$, in at least one region Gi, a signal is emitted.

FIG. 2b also shows that reference regions $R_i$ are captured in image B. The reference regions $R_i$ are preferably exactly as many pixels wide as the regions $G_i$. The press element 26 moves at the feed speed v. In order to keep external influences on the measurement result as small as possible, the relative brightness $\bar{b}$ is preferably used over the absolute brightness B, wherein the relative brightness indicates the difference when compared with the same region on the press element 26 whilst passing through the reference region $R_i$.

Alternatively, the change parameter D is calculated using the method described above; however, before comparing it with the tolerance value $T_t$, a reference change parameter $D_R$ is deducted, which is calculated from the corresponding pixels of the reference region $R_i$ at a point in time at which the corresponding area of the press element 26 has passed the reference region $R_i$.

Figure 3:
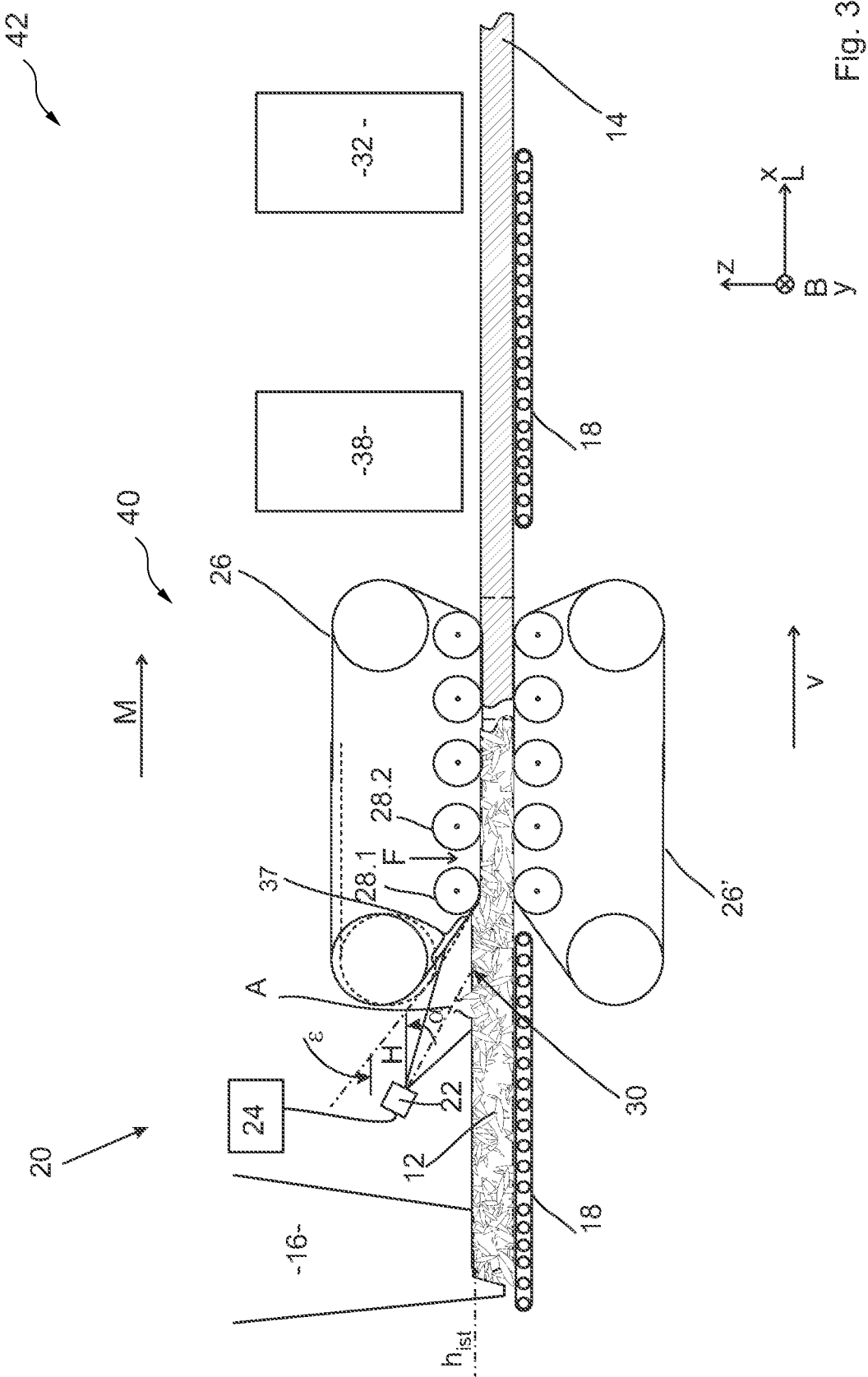
FIG. 3 depicts an alternative embodiment of a wood material panel pressing device according to the invention which has a pre-press.

FIG. 3 depicts a second embodiment of a wood material panel pressing system 42 according to the invention that features a pre-press 40 that is arranged in front of a hot press 38 as described above, said pre-press compacting the fibrous press cake 12 before it enters the hot press 38. The press element 26 of the pre-press 40 is designed to be a press cloth.

FIG. 4a shows a top view of a wood material panel pressing device 10 that comprises a projector 42 for projecting light 44 onto the press cake 12. In the present example, the light 44 is a fan beam. As long as a surface 46 of the press cake 12 is even, the fan beam 44 produces an illuminated area 48 that extends a long straight line. The illuminated area 48 may be rectangular. A camera 50 detects the illuminated area 48 and send the images to the evaluation unit 24.

The evaluation unit 24 calculates the evaluation of the recorded picture of the actual area 48 from a desired shape of the area 48. As long as the surface 46 is as even as it should be, the shape of the area 48 does not deviate much this desired shape. In the example of FIG. 4a, the evaluation unit 24 could, for example, calculate the number of pixel of the area 48 outside a small rectangular band or the number of dark pixels inside the rectangular strip.

FIG. 4b shows the wood material pressing device 10 of FIG. 4a. The fan beam 44 runs at an angle ω that is usually smaller than 90°, in particular smaller than 45°. For example, the ankle may be φ=20±5°. The smaller the angle φ, the more sensitive the system. However, the angle φ should not be too small, as the system could then become over-sensitive.

FIGS. 5a and 5b show the same setup as FIGS. 4a and 4b, wherein the press cake 12 has blow-out area 52, in which a blow-out event has occurred. The fan beam 44 produces an illuminated area 48 that is distorted in the blow-out area 52, as can be seen in FIG. 5a. The camera 50 detects the illuminated area 48 and the evaluation unit 24 detects the deviation from the expected shape and emits a warning signal. For example, the number of pixels showing an illumination outside the rectangular strip increases a pre-set maximum.

FIG. 6 shows that a level error Δh can be detected with the camera 50. The reason is that the bigger the level error Δh, the stronger is the deviation between a position P1 were the fan beam 44 should hit the surface 46 and the actual position P2 that is caused by the different height of the blow-out area 52.

What is claimed is:

1. A wood material panel pressing device for pressing a fibrous press cake for producing an HDF panel or an MDF panel comprising:
   (a) an inspection device, which is designed to emit a signal in an event of a disruption, wherein:
   (b) the inspection device has a camera and an evaluation unit,
   (c) the camera is arranged in an intake region of the wood material panel pressing device; and
   (d) the evaluation unit automatically emits a signal in an event of a blow-out of press cake particles.

2. The wood material panel pressing device according to claim 1, wherein:
   (i) the wood material panel pressing device comprises a belt press having a first pressing belt and a second pressing belt; and
   (ii) the first pressing belt and the second pressing belt form a gap at an outtake region between 1.5 and 5 millimeter.

3. A wood material panel pressing device for pressing a fibrous press cake for producing an HDF panel or an MDF panel, comprising:
   (a) an inspection device, which is designed to emit a signal in the event of a disruption, wherein:
   (b) the inspection device has a camera and an evaluation unit,
   (c) the camera is arranged in an intake region of the wood material panel pressing device; and
   (d) the evaluation unit is designed to automatically carry out a method featuring the steps:
      (i) continuous recording of images (B) of the intake region,
      (ii) continuous detection of measurement data for evaluation region pixels of the images (B), which belong to a predefined evaluation region of a surface of the fibrous press cake, such that evaluation data is obtained, wherein the evaluation data relate to a local height of the fibrous press cake and
      (iii) emission of a signal if the evaluation data indicate a change in the local height by more than a predetermined tolerance value ($D_T$).

4. The wood material panel pressing device according to claim 1, further comprising a spreading device for spreading the fibrous press cake onto a conveyor.

5. The wood material panel pressing device according to claim 3, wherein the disruption is a blow-out event.

6. The wood material panel pressing device according to claim 3, wherein the wood material panel pressing device is adapted for producing an MDF plate having a thickness between 1.5 and 3.0 millimeter.

7. The wood material panel pressing device according to claim 3, further comprising a fan beam projector for projecting a fan beam under an acute angle onto the fibrous press cake.

8. The wood material panel pressing device according to claim 3, further comprising:
   (a) a compactor for squeezing air out of the fibrous press cake, wherein the compactor is after a spreading device in a direction of travel of the fibrous press cake; and
   (b) a continuous hot press, which is after the compactor in the direction of travel,
   (c) wherein the camera is located between the compactor and the continuous hot press.

9. The wood material panel pressing device according to claim 3, further comprising:
   measurement data recorded for a number of regions ($B_i$); and
   wherein the regions ($B_i$) border one another and together cover a full width (B) of the fibrous press cake.

10. The wood material panel pressing device according to claim 3, further comprising:
    a circulating press element for pressing the fibrous press cake,
    wherein continuous recording of measurement data for reference region pixels which belong to at least one predetermined reference region ($R_i$),
    wherein precisely one reference region (R) is allocated to each evaluation region, said one reference region being located in front of the evaluation region in terms of a direction of movement of the circulating press element, and
    wherein the continuous recording of measurement data for evaluation region pixels, which belong to at least one predetermined evaluation region, comprises a calculation of a deviation between:
        the measurement data of the evaluation region pixels; and
        the measurement data of the reference region pixels that have been shifted by a time delay, and
    wherein a time delay is the time needed for a section of the circulating press element to pass from the reference region to the evaluation region.

11. The wood material panel pressing device according to claim 1, wherein:
    the wood material panel pressing device is a hot press and the press element is a press plate, or
    the wood material panel pressing device is a pre-press and the press element is a press cloth.

12. The wood material panel pressing device according to claim 1, further comprising a lighting device for illuminating the intake region.

13. The wood material panel pressing device according to claim 1, wherein the inspection device is designed to automatically carry out a method according to claim 1.

14. The wood material panel pressing device according to claim 1, further comprising an optical axis (A) of the camera which forms an axis angle (α) with a horizontal (H) that lies between 0° and 20°.

15. A method for monitoring a wood material panel pressing device for pressing a fibrous press cake to produce an HDF panel or an MDF panel, comprising:

(i) continuous recording of images (B) of an intake region,
(ii) continuous detection of measurement data for evaluation region pixels of images, which belong to a predefined evaluation region of a surface of the fibrous press cake, such that evaluation data is obtained, wherein the evaluation data relate to a spatially resolved height of the fibrous press cake, and
(iii) emission of a warning signal if the evaluation data indicate a change in the height by more than a predetermined tolerance value ($D_T$).

16. A method for monitoring a wood material panel pressing device for pressing a fibrous press cake to produce an HDF panel or an MDF panel, comprising:
    (i) continuous recording of images (B) of an intake region,
    (ii) continuous detection of measurement data for evaluation region pixels of images, which belong to a predefined evaluation region of a surface of the fibrous press cake, such that evaluation data is obtained, and
    (iii) emission of a warning signal in the event of a blow-out of press cake particles.

17. The method according to claim 15, further comprising:
    (i) grouping of evaluation pixels into a first region (G1) and at least one second region (G2), and
    (ii) for all regions ($G_i$):
        detection of the pixels which feature one property that changes more drastically than a threshold value,
        calculation of a change parameter (D) from the number of the pixels, and
        comparison of this change parameter (D) with the tolerance value ($D_T$).

18. The method according to claim 15, wherein the evaluation region pixels are grouped into at least 20 regions (G).

19. The method according to claim 15,
    wherein the emission of the warning signal effects an adjustment of an intake angle, and
    wherein the intake angle is the angle between a horizontal plane and a press element of the wood material panel pressing device.

20. The method according to claim 15, wherein the emission of the warning signal effects an adjustment of a feed speed (v).

21. The method according to claim 15, further comprising:
    (i) calculation of a position of an actual horizontal of the fibrous press cake, and
    (ii) emission of a signal if the actual horizontal deviates from the target horizontal by more than one level error threshold value ($\Delta h_S$).

22. The method according to claim 15, wherein the one property is color, brightness, contrast with at least one adjacent pixel.

23. The method according to claim 15, wherein an MDF plate having a thickness between 1.5 and 3.0 millimeter is produced.

24. The method according to claim 15, wherein an MDF plate having a thickness between 1.5 and 3.0 millimeter is produced.

25. The method according to claim 15, further comprising the steps:
    (i) projecting a fan beam under an acute angle onto the fibrous press cake, and
    (ii) determining the evaluation data from a shape of the fan beam on a surface of the fibrous press cake.

26. The method according to claim 15, wherein the recorded images (B) pictures of the intake region are stored together with a time stamp.

* * * * *